(12) United States Patent
Voeykov

(10) Patent No.: US 8,414,824 B2
(45) Date of Patent: Apr. 9, 2013

(54) METHOD OF CONSTRUCTING A THIN FILM MIRROR

(76) Inventor: Vladimir Vasilyevich Voeykov, Zhukovsky (RU)

( * ) Notice: Subject to any disclaimer, the term of this patent is extended or adjusted under 35 U.S.C. 154(b) by 0 days.

(21) Appl. No.: 12/737,954

(22) PCT Filed: Aug. 13, 2009

(86) PCT No.: PCT/RU2009/000405
§ 371 (c)(1),
(2), (4) Date: Mar. 3, 2011

(87) PCT Pub. No.: WO2010/027293
PCT Pub. Date: Mar. 11, 2010

(65) Prior Publication Data
US 2011/0163465 A1    Jul. 7, 2011

(30) Foreign Application Priority Data

Sep. 4, 2008   (RU) .............................. 2008135765

(51) Int. Cl.
*B29C 51/10*   (2006.01)
(52) U.S. Cl.
USPC .......................................... 264/547; 264/553
(58) Field of Classification Search ................... 264/547
See application file for complete search history.

(56) References Cited

U.S. PATENT DOCUMENTS
6,758,569 B2   7/2004   Creek

FOREIGN PATENT DOCUMENTS
EP    0 821 797      12/2001
RU    2 065 616       8/1996
WO    WO 2007/007024  1/2007

OTHER PUBLICATIONS

International Search Report.

*Primary Examiner* — Yogendra Gupta
*Assistant Examiner* — Alison Hindenlang
(74) *Attorney, Agent, or Firm* — Collard & Roe, P.C.

(57) ABSTRACT

Method for producing a large size mirror from a thin film, involving (a) the attachment of a thin film to a suction chamber, the edge of which has the required geometry of the mirror, and (b) the production of a controllable partial vacuum in the suction chamber so that the thin film takes on the required geometry of the mirror. The method is characterized in that the region of the mirror having the required geometry is enlarged by preshaping the thin film, prior to the attachment thereof to the suction chamber, by controlled tensioning in a closed pressurization chamber comprising two circular discs with a common axis and a thin film which is attached to the edges of the discs and the lateral sides of which are conjoined so as to form a conical surface, and by additionally tensioning the thin film by means of a mechanism for moving the discs apart along the common axis thereof. In order to facilitate and accelerate the process of forming a mirror from a thin film, the pressurization chamber together with the thin film attached thereto is placed in a thermal box in which the film is uniformly heated to an optimum temperature for deforming the film under increased pressure in the pressurization chamber.

3 Claims, 4 Drawing Sheets

METHOD OF CONSTRUCTING A THIN FILM MIRROR

CROSS REFERENCE TO RELATED APPLICATIONS

This application is the National Stage of PCT/RU2009/000405 filed on Aug. 13, 2009, which claims priority under 35 U.S.C. §119 of Russian Application No. 2008135765 filed on Sep. 4, 2008, the disclosure of which is incorporated by reference. The international application under PCT article 21(2) was not published in English.

TECHNICAL FIELD

The invention relates to a method of constructing large-size concave mirrors. They are used as part of collimation displays in visualization systems offering large fields of vision in flight imitating. Thin film mirrors are also used in game systems, solar collectors, telescopes, and similar devices.

BACKGROUND ART

At present methods of constructing large-size concave thin film mirrors are rather complicated, labor-intensive and expensive.

The method of constructing curved reflecting surfaces comprises placing a flat blank onto a matrix, then a specific mechanical and chemical treatment of the blank follows. This way is used to construct reflecting surfaces for the needs of optical industry, but it is not suitable for producing large-size thin film mirrors (Patent RU 2065616 C1 G 02 B 5/10).

Thin film is a kind of thin polymer film, polyethylene terephthalate, for example, or other suitable thin film. To give reflecting properties to the film one or both sides of its surface are coated with a layer of aluminum.

As a rule, concave thin film mirrors are constructed with the help of a suction chamber. The edges of the chamber are adapted for attaching the thin film and they lie in a desired invariable geometry. To imitate flight in ground-based simulators spherical mirrors are employed. In this case the suction chamber edges lie on the spherical surface. The thin film used for producing a mirror has the shape of a large flat sheet without initial tension. The film is attached to the edges of the suction chamber. Tension in the film is introduced while the air pressure in the suction chamber is reduced by a vacuum pump or when differential pressure is applied to the film surfaces forcing the film to be drawn into the suction chamber. An ideal shape will be achieved when the tensions in the thin film are close to uniform over the entire surface of the thin film. However in practice, while a large-size concave mirror is being formed an area in which the performance is not satisfactory inevitably arises in a border region of a thin film mirror, the border region being that portion of the thin film adjacent to the edge of the suction chamber. The tension in the film in the border region differs dramatically from the tension in the central region. This unusable border area is known as the mirror deadband. The irregular geometry of the mirror in the deadband makes it impossible to use the entire reflecting surface of the mirror. This in turn requires the thin film mirror to be constructed substantially larger, and causes raising its production cost.

There are methods elaborated to reduce the deadband by applying various tensioning means on the mirror. The most advanced method known on the priority date of the present invention is (A Method of Constructing a Thin Film Mirror, PCT WO 2007/007024 A1, Jun. 5, 2006), which includes the following:

(i) Attaching the thin film to the suction chamber, the suction chamber having edges which are adapted for attaching the thin film and which lie in a desired geometry for the thin film mirror to be constructed;

(ii) Applying a partial vacuum in the suction chamber such that tension is introduced into the thin film;

(iii) Adjusting the partial vacuum to form the thin film mirror but with the thin film mirror achieving the desired geometry only over a portion of the thin film mirror;

(iv) providing first tensioning means and locally adjusting the first tensioning means such that the portion of the thin film mirror which achieves the desired geometry is increased, the first tensioning means being in contact with the surface of the thin film adjacent to the edge of the suction chamber at a first distance which is substantially uniform from the edge of the suction chamber; and (v) providing second tensioning means locally adjusting the second tensioning means such that the portion of the thin film mirror which achieves the desired geometry is further increased, the second tensioning means at a second distance which is substantially uniform from the edge of the suction chamber, and which second distance from the edge of the suction chamber of the first tensioning means.

This method makes it possible to construct a large-size concave thin film mirror with a central part of a desired geometry.

However, the described above method of producing a thin film mirror does not provide mirrors without an area in which the performance is not satisfactory (the deadband). The deadband in a border region of a thin film mirror comprises a substantial portion of its surface which turns out useless and requires masking unless additional special-purpose means are used. The special-purpose tensioning means reduce the width of the deadband. Anyhow, even as an integral part of a finished mirror, those means do not eliminate the deadband completely, and the finished mirror in this case has larger geometrical sizes as compared to a mirror with a entirely reflecting surface. Moreover, installing additional tensioning means on a finished mirror lead to more expensive production costs.

DISCLOSURE OF THE INVENTION

The object of the present invention is to develop a method of producing a thin film mirror. The developed method makes it possible to completely eliminate the deadband from the reflecting surface of the finished mirror and to do away with tensioning means.

A thin film mirror formed according to the developed method acquires improved characteristics, such as: the smallest possible geometrical sizes of the mirror with the desired size of the field of vision, the absence of the deadband on its surface, the absence of any tensioning means. These improved characteristics are achieved by using the equipment required for constructing a thin film mirror and including:

A suction chamber having the edges which are adapted for attaching the thin film and which lie in a desired geometry for the thin film mirror to be constructed;

A vacuum pump to reduce pressure inside the suction chamber for smoothing out the thin film surface;

and, in accordance with the invention, additionally comprising the following equipment:

A pressurization chamber comprising two circular disks with a common axis of symmetry and a special-purpose mechanism for moving the disks apart from each other along this axis;

A forcing pump;

A thermal box for the pressurization chamber to be placed therein.

The additional equipment serves to preliminary tension the thin film and to shape it up to a form a spherical form before the thin film is attached to the edges of the suction chamber. This is achieved by using the following procedures:

The flat sheet of the thin film, still given no tensioning, is attached to the edges of the disks of the pressurization chamber, these edges having the geometry of the created mirror and being adapted to attaching the thin film. The thin film and the disks taken together create a closed cavity. The forcing pump charges a controllable elevated pressure in the created cavity to tension the thin film and to give the desired geometry to its central area. The mechanism to move the disks apart from each other within a predetermined distance additionally tensions the thin film. Thus, the width of the mirror's deadband is significantly decreased. The tensioning means lying on the thin film surface and reducing the effective area of the finished mirror are unnecessary.

To accelerate and to facilitate the mirror constructing process the pressurization chamber together with the thin film attached to its edges is placed in a thermal box in order to heat the thin film uniformly up to a temperature level which is optimal (depending on the physical properties of the thin film used) to deform the thin film under the elevated pressure in the pressurization chamber. This makes it possible to effectuate the necessary deformation of the thin film under lower tensioning values as compared to former methods. Thus, the claimed procedures for producing a thin film mirror are dramatically simplified.

From the technical point of view the claimed invention leads to constructing a large concave thin film mirror without any deadbands.

THE BEST MODE TO IMPLEMENT THE INVENTION

Thin film is attached to the pressurization chamber containing two circular disks having a common axis of symmetry and the mechanism for moving the disks apart from each other. The mechanism is installed either inside or outside of the pressurization chamber. The side edges of the thin film are joined together to give it the shape of a circular cone. The disks are designed to have specific diameters, the distance between the disks is deliberately chosen so that the formed mirror would ultimately possess the desired geometry.

To accelerate and to facilitate the process of the thin film deformation, the pressurization chamber with the thin film and the extension mechanism are placed into a thermal box. The temperature inside the thermal box is elevated up to a level which is optimal for the thin film deformation. The pressure in the pressurization chamber is elevated while the disks of the pressurization chamber are moved apart from each other within the desired distance. This procedure makes it possible to form the thin film according to the desired mirror shape and to reduce the size of the deadbands. The temperature inside the thermal box is lowered to its normal level without reducing the elevated pressure inside the pressurization chamber. This helps to fix the shape of the resultant thin film mirror.

The suction chamber with the edges repeating the final mirror geometry is attached to the convex side of the film under elevated pressure so that the resultant dead bands and the area of the film side edges joint were situated outside of the suction chamber area. Then the air pressure in the pressurization chamber is reduced to its normal level, and the suction chamber with the thin film is detached from the pressurization chamber.

Finally, a vacuum pump lowers the pressure in the suction chamber; the thin film is smoothed out and acquires the desired shape of the finished mirror, which has neither deadbands nor tensioning means.

Performing the sequence of the claimed steps makes it possible to produce thin film large-size mirrors for visualization systems with a maximum possible desired field of vision, free from any useless deadbands and additional means. The claimed method shortens and facilitates the construction procedure of thin film mirrors by means of heating the film in a thermal box.

Here below an example is described of how the claimed method can be utilized for producing a thin film mirror in accordance with the claimed invention.

Figure 1:
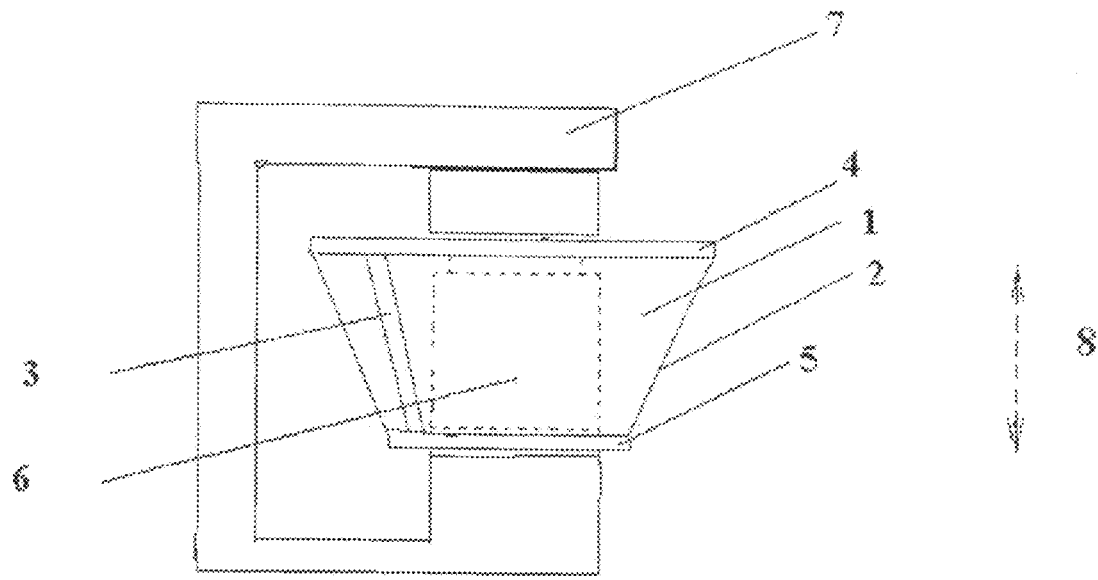
FIG. 1 shows a view of a pressurization chamber with a thin film attached to its edges and the mechanism for moving apart the upper and lower disks of the pressurization chamber along their common axis.

FIG. 1 shows pressurization chamber 1, thin film 2 is attached to the edges of the chamber. The side edges of the film are joined together in area 3. Pressurization chamber 1 for tensioning the thin film comprises two circular disks 4 and 5 with a common axis of symmetry. The mechanism for moving apart disks 4 and 5 can be installed either inside the pressurization chamber (internal mechanism 6) or outside the pressurization chamber (external mechanism 7). The air pressure inside pressurization chamber 1 is not elevated. The thin film is not tensioned; it retains the form of a flat sheet extended between the edges of the pressurization chamber. Dash line 8 shows the maximum possible effective surface of the film.

Figure 2:
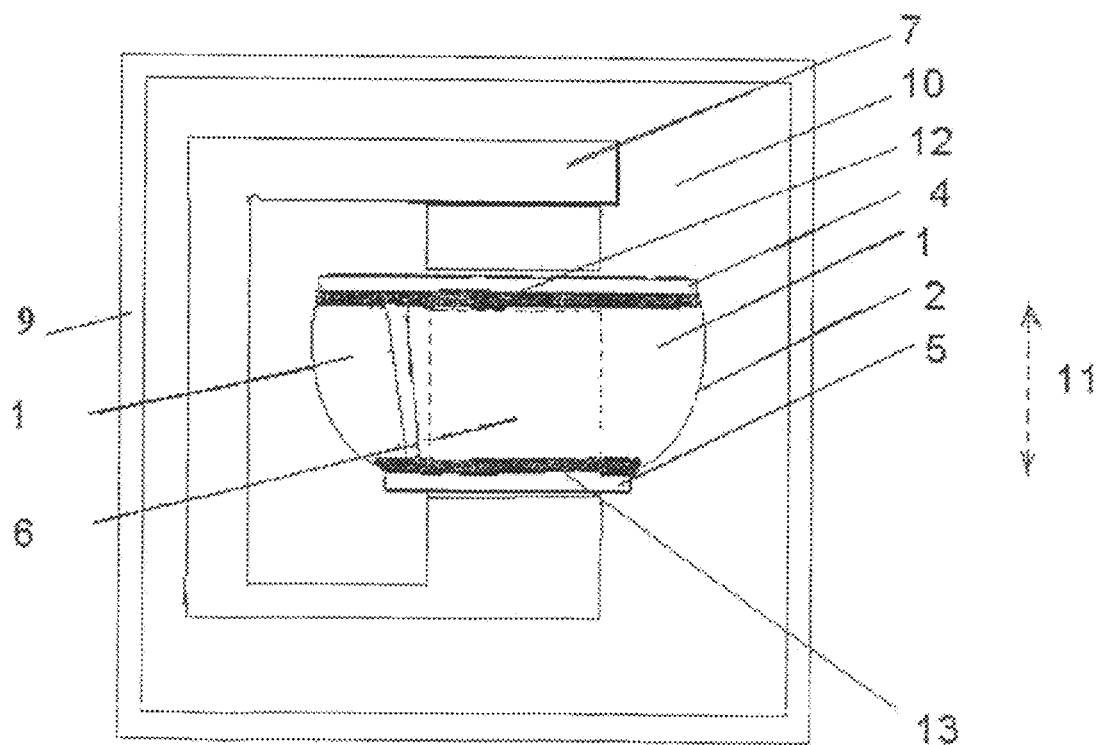
FIG. 2 shows a view of the thermal box. The pressurization chamber is placed into the thermal box together with the mechanism for moving the disks apart from each other. The thin film is heated and tensioned under the elevated pressure in the pressurization chamber and also by moving the disks apart from each other within the desired distance.

FIG. 2 shows thermal box 9. Pressurization chamber 1 is placed into thermal box 9 either with internal mechanism 6 or with external mechanism 7. The air pressure in internal part 10 of thermal box 9 is elevated up to an optimal level which causes tensioning the thin film. The air pressure in the internal part of pressurization chamber 1 is elevated; either internal mechanism 6 or external mechanism 7 is activated to move disks 4 and 5 apart within the desired distance. Under the elevated temperature and the elevated air pressure in pressurization chamber 1 thin film 2 is tensioned to take the desired shape, excluding the shaded deadbands adjacent to the areas where the thin film is attached to the edges of pressurization chamber 1. The additional tensioning of thin film 2 by moving apart disks 4 and 5 within the desired distance 11 helped to reduce the size of deadbands 12 and 13 as compared to their initial sizes. Therefore, the effective area of the thin film mirror expanded.

Figure 3:
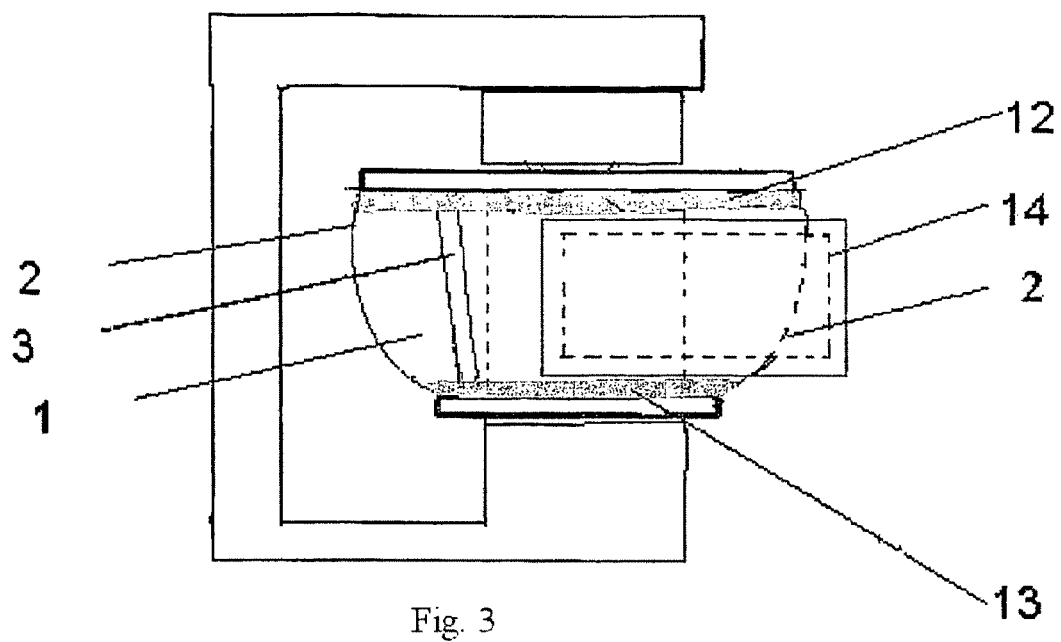
FIG. 3 shows a view of the pressurization chamber after it was removed from the cooled thermal box. The tensioned thin film is attached to the edges of the pressurization chamber. The suction chamber is attached to the convex surface of the thin film.

FIG. 3 shows pressurization chamber 1 and suction chamber 14. Thin film 2 is attached to the edges of the suction chamber. The temperature is lowered to its normal level, the pressure in the internal part of pressurization chamber 1 remains elevated. The shape of thin film 2 approaches the desired shape, excluding deadbands 12 and 13. Suction chamber 14 has the edges of the final mirror geometry. Suction chamber 14 is attached to the convex side of the thin film so that deadbands 12 and 13 and joint area 3 where the side edges of the thin film are joined together were situated outside suction chamber 14.

Figure 4:
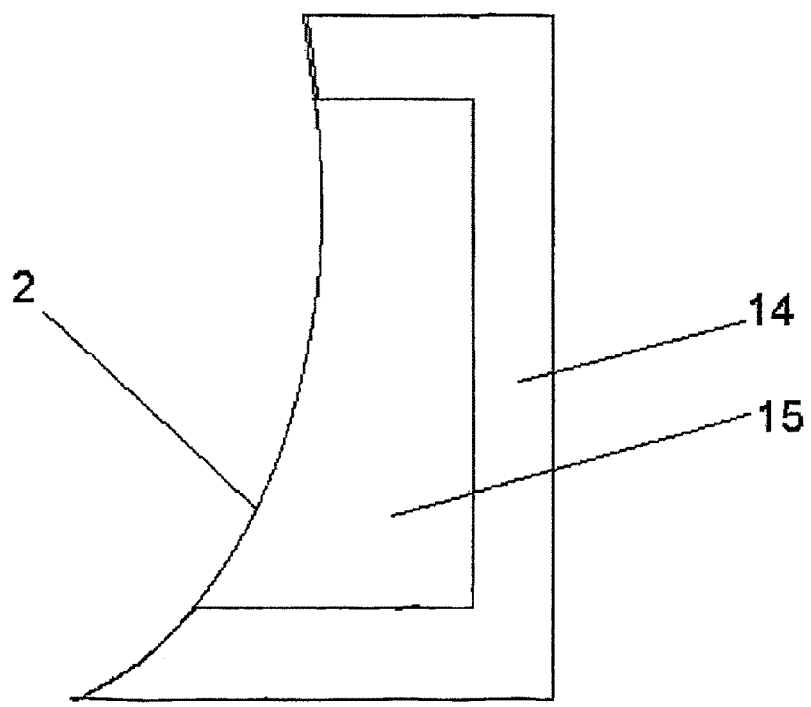
FIG. 4 and FIG. 5 show a cross-sectional view and a general view, respectively, of the suction chamber with the thin film attached to its edges. The suction chamber is separated from the pressurization chamber. Partial vacuum inside the pressurization chamber is generated to smooth out the surface of the thin film which acquired the desired geometry of the mirror.

FIG. 4 shows a cross-sectional view of suction chamber 14 with thin film 2 attached to the edges of the chamber. Thin film 2 is the central area of the film which was previously subjected to the desired deformation in the pressurization chamber. Suction chamber 14 is now detached from the pressurization chamber and partial vacuum is maintained in internal cavity 15 of suction chamber 14. As a result, thin film 2 acquired the desired shape of the finished thin film mirror free from any useless deadbands and tensioning means.

Figure 5:
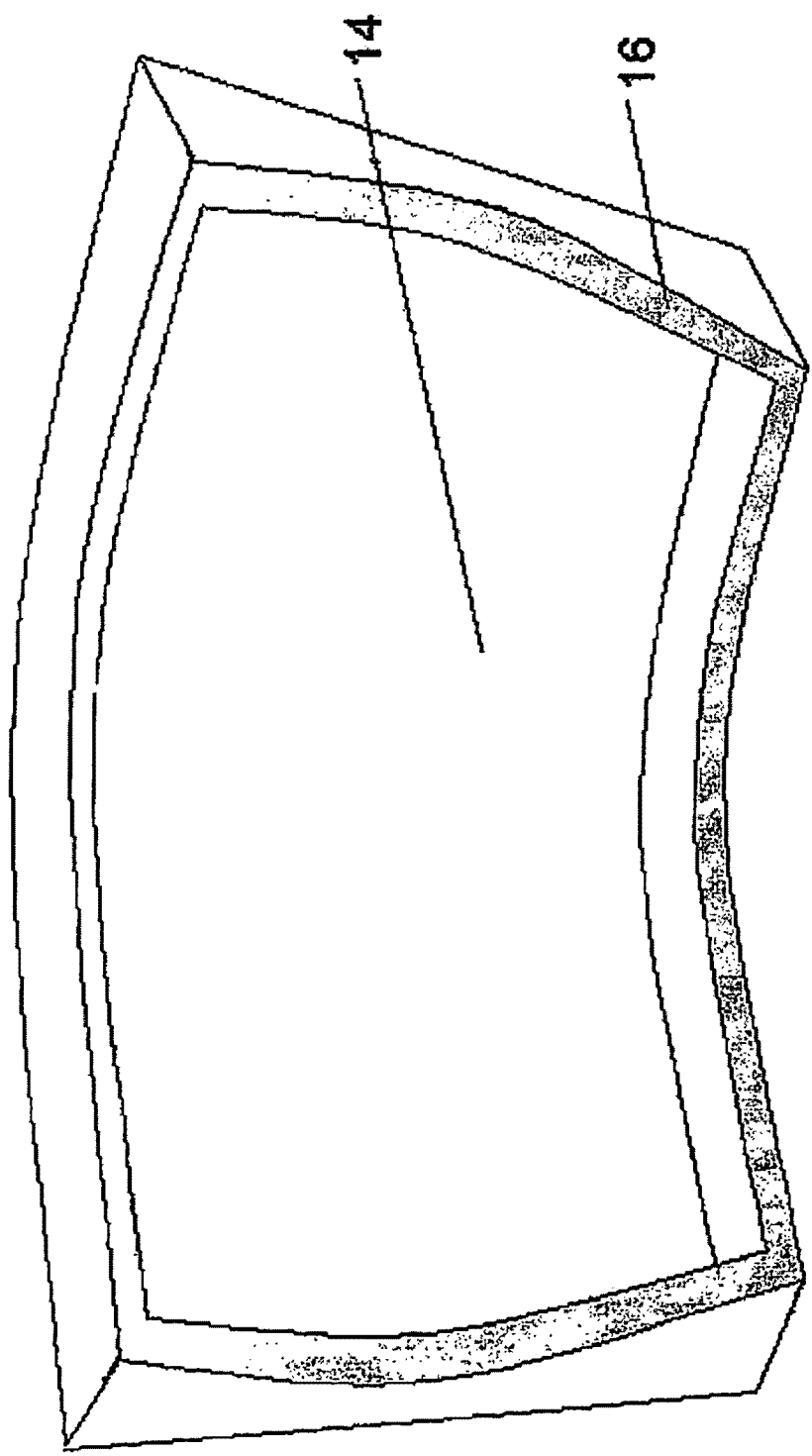

FIG. 5 shows a general view of suction chamber 14 with edges 16 which are adapted for attaching the thin film and have the geometry of a the finished mirror.

Figure 6:
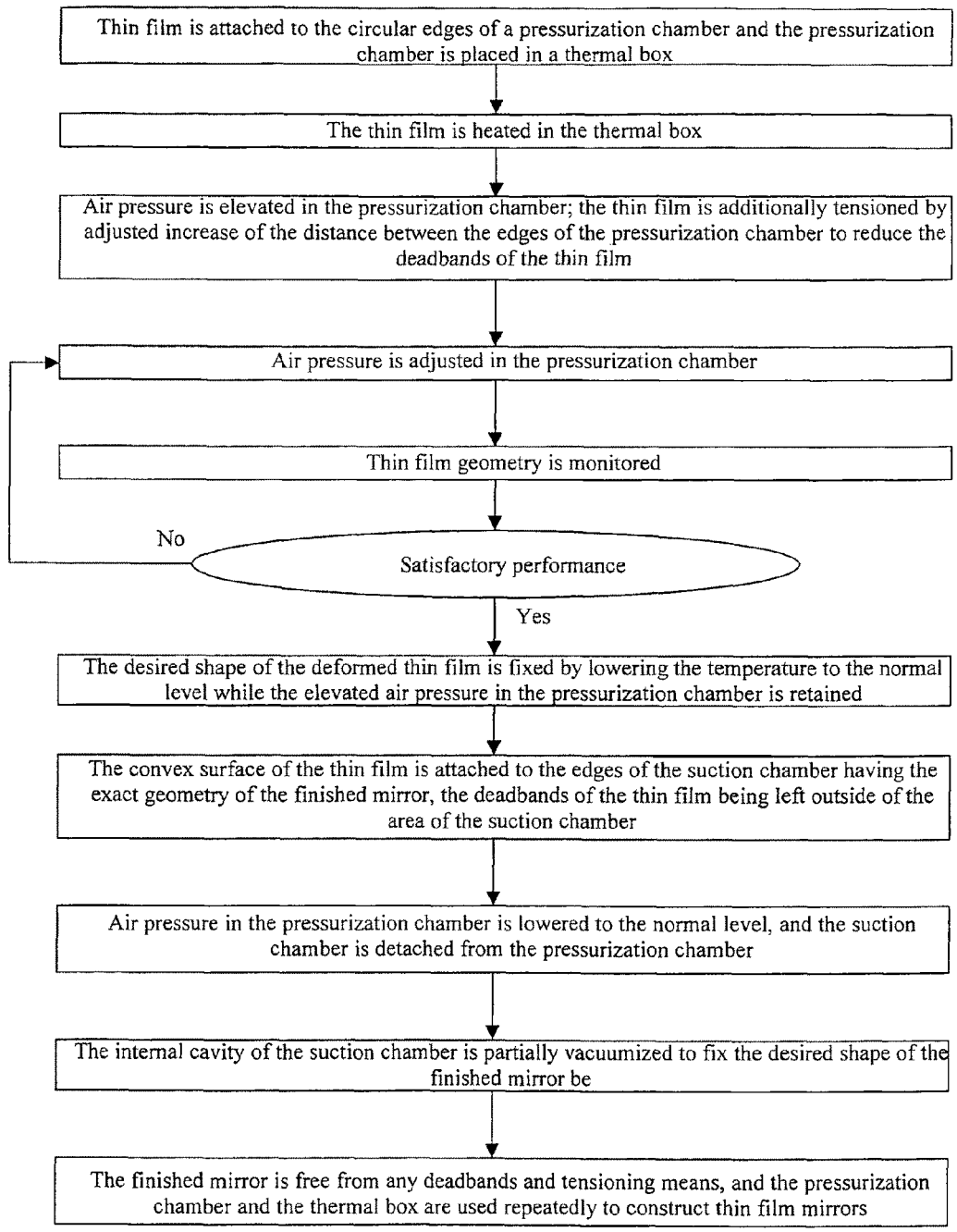
FIG. 6 shows a flow chart identifying method steps employed to construct a thin film mirror.

FIG. 6 shows a flow chart identifying method steps employed to construct a thin film mirror by using a pressurization chamber, a thermal box, and a suction chamber. As a result, the constructed mirror has the desired characteristics and is free from any deadbands and tensioning means.

The invention claimed is:
1. A method of constructing a thin film mirror, comprising:
 (a) attaching a thick film to a suction chamber having edges which lie in a surface having the required geometry for the thin film mirror to be constructed where the thin film attaches to the edges;
 (b) applying a partial vacuum to the suction chamber such that tension is introduced into the thin film;
 (c) adjusting the partial vacuum in the suction chamber to form the thin film surface of the desired mirror geometry;
 wherein the mirror zone having the desired geometry is expanded by preliminary deforming the thin film before attaching to the suction chamber by:
 attaching the thin film to two circular disks in a closed pressure chamber, the disks having a common axis and edges of the desired surface geometry of the mirror to be constructed with the side edges of the thin film joined together to shape the thin film into a circular cone; and
 deforming the film by adjusting the tensioning with a forcing pump and by additional tensioning the thin film by using a mechanism for moving the disks apart along the common axis to a desired distance.

2. The method of constructing a thin film mirror according to claim 1, comprising:
 positioning the suction chamber to attach to the central convex area of the thin film which is tensioned in the pressurization chamber so that the areas adjacent to the edges of the pressurization chamber and near the joined side edges of the thin film are situated outside the area limited by the edges of the suction chamber thereby eliminating areas where performance is unsatisfactory from the finished thin film mirror surface.

3. The method of constructing a thin film mirror according to claim 1, comprising:
 accelerating the mirror constructing process by placing the pressurization chamber together with the thin film attached to its edges in a thermal box;
 heating the thin film uniformly up to a temperature which is optimal to deform the thin film under the elevated pressure in the pressurization chamber.

\* \* \* \* \*

UNITED STATES PATENT AND TRADEMARK OFFICE
CERTIFICATE OF CORRECTION

PATENT NO.        : 8,414,824 B2
APPLICATION NO.   : 12/737954
DATED             : April 9, 2013
INVENTOR(S)       : Voeykov Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Twenty-first Day of May, 2013

Teresa Stanek Rea
*Acting Director of the United States Patent and Trademark Office*